K. A. AHLFORS.
TURBINE.
APPLICATION FILED MAY 27, 1920.
1,402,992. Patented Jan. 10, 1922.
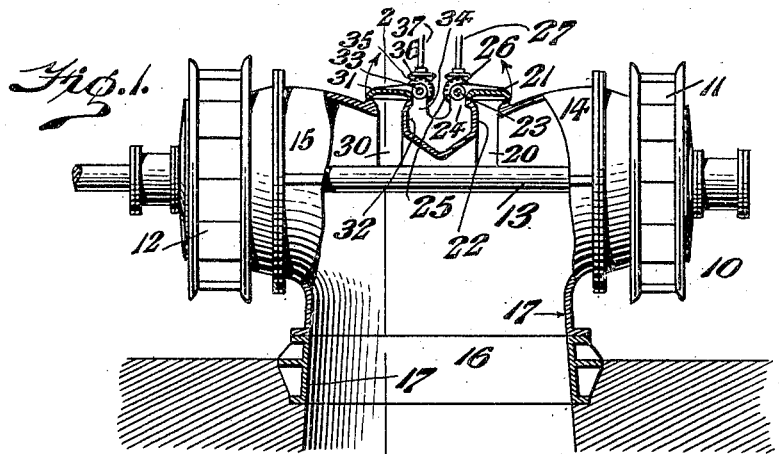
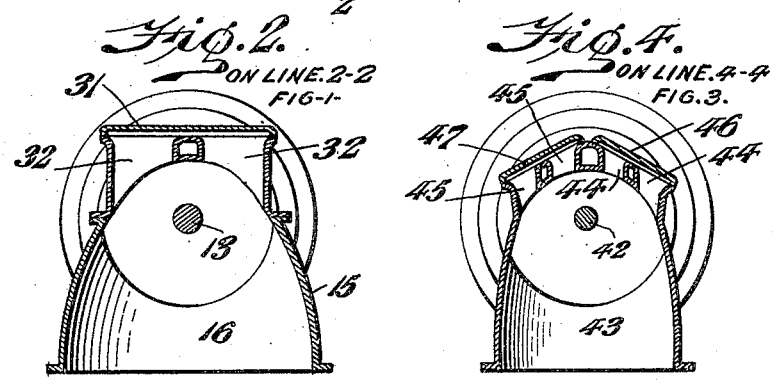
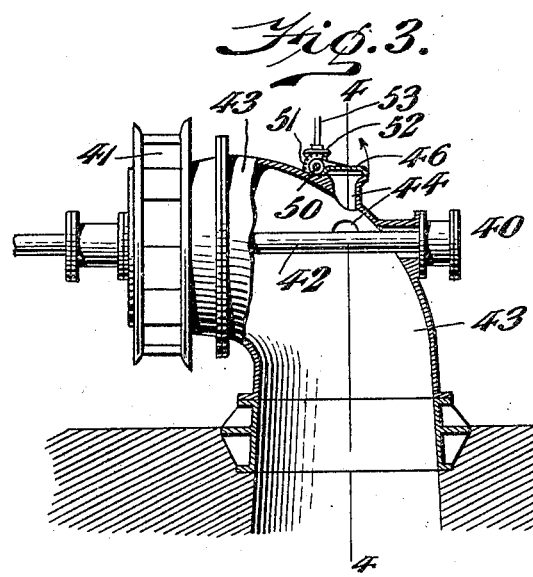
INVENTOR
Karl Axel Ahlfors.
BY
Robert M. Barr
ATTORNEY

UNITED STATES PATENT OFFICE.

KARL AXEL AHLFORS, OF HELSINGFORS, FINLAND.

TURBINE.

1,402,992.

Specification of Letters Patent. Patented Jan. 10, 1922.

Application filed May 27, 1920. Serial No. 384,630.

*To all whom it may concern:*

Be it known that I, KARL AXEL AHLFORS, a citizen of Finland, and a resident of Helsingfors, Finland, have invented certain new and useful Improvements in Turbines, of which the following is a specification.

Some of the objects of the present invention are to provide means for increasing the efficiency of a water driven turbine; to provide means for lowering the back pressure at the outlet side of the wheel of a turbine; to provide means for increasing the velocity of the water at the discharge end of a turbine; to provide means for admitting water under pressure to a turbine at a location relatively close to the outflow side of a turbine wheel under high water conditions, and to provide other improvements as will hereinafter appear.

In the accompanying drawings Fig. 1 represents a side elevation in part section of a turbine embodying one form of the present invention; Fig. 2 represents a section on line 2—2 of Fig. 1; Fig. 3 represents a side elevation in part section of another form of turbine embodying the present invention; and Fig. 4 represents a section on line 4—4 of Fig. 3.

Referring to Figures 1 and 2 of the drawings one form of the present invention is shown as arranged upon a turbine 10 of the double, inward and downward flow type, having two inlet gates 11 and 12 mounted in spaced relation and arranged to direct the inflowing water to the respective wheels (not shown) which are mounted in the usual manner upon a driven shaft 13, though obviously this arrangement can be changed for varying conditions or requirements. The inflowing water from the opposite ends of the turbine passes respectively through pipe bends 14 and 15, and discharges by way of a common discharge pipe 16, which is here shown as a downward flow having outwardly diverging side walls 17 to reduce friction and back pressure.

For the purpose of maintaining the efficiency of the turbine substantially constant under operating conditions irrespective as to whether the water is low or high, the pipe bend 14 is provided with a plurality of inlet openings or conduits 20 which admit water from the outside of the turbine and act as ejectors to direct the water entering by conduits 20 in the same direction as the body of water passing through the discharge outlet 16. These conduits 20 are preferably inwardly extending tubes integral with or rigidly secured to the main pipe casing in a manner to direct the water passing through them in the direction of the main water discharge. These conduits 20 are arranged to be opened and closed at will by a common valve 21 which seats on a neck or flanged part 22 fixed to the pipe casing and arranged to give the desired length to the conduits 20 for the purpose intended. The valve 21 is preferably arranged to swing toward and away from its seat by connection with a rod 23, which is journalled in a lug 24 and carries a gear 25 in mesh with a second gear 26 fast to an operating rod 27, this latter extending to a convenient point of operation. The opposite pipe bend 15 is similarly provided with two conduits or openings 30 similar to the conduits 20 and arranged to be opened and closed at will by a common valve 31 which seats on a neck member 32 and is arranged to be operated by a separate means, similar to that described, including a rod 33 journalled in a lug 34, gears 35 and 36, and an operating rod 37 extending to a convenient place for operation. It will be evident that either valve can be opened or closed as desired and selective operation is possible, thus two conduits on one side may be open and the two on the other side closed, or all may be open, or all may be closed, depending upon conditions. Under normal and low water conditions both valves 20 and 30 are kept closed and the turbine operates without the ejector action. The amount of opening of the valves may also be varied to meet different requirements.

Referring to Figures 3 and 4 of the drawings, a turbine 40 of the inward, downward type is shown having one inlet gate 41 instead of two, and the incoming water actuates the wheel to drive the shaft 42. In this form of the invention the inlet pipe bend 43 is provided with two sets of inlet ejector passages 44 and 45, preferably two passages for each set which are arranged to be controlled by the respective valves 46 and 47. The passages 44 and 45 are formed by suitably casting or forming the pipe wall to provide for the admission of some of the water directly into the pipe bend and in the direction of flow of the main discharge water. These valves 46 and 47 have separate means for operating them so that either can be operated independent of the other, and since these operating mechanisms are similar the description will be limited to one. The valve 46 is fixedly secured to a rod 50 which is suitably journalled and carries a gear 51 in mesh with a gear 52 fast to an operating rod 53 which extends to a convenient place for operation.

In order to clearly point out the object and operation of the foregoing construction it should be understood that the height of fall and the volume of water at a power site undergo considerable variation and to compensate in a manner for this variation it is customary to design and construct the turbines for conditions prevailing for about seven months of the year. As a result it follows that the turbines cannot be used to full capacity during a low water period, while under high water conditions only a relatively small part of the volume of water available can be used by turbines as at present constructed. Thus in spite of an abundance of water the horse-power generated is less than under normal water conditions. While ejectors have heretofore been tried with poor success at points removed from the turbine there has been no direct action to relieve pressure within the turbine. In the present invention the ejector means are arranged in direct connection with the turbines and function within the turbine where they can be regulated at will as required. Thus when the valves 21 and 31 of Fig. 1 are open the outside water rushes through the openings 20 and 30 with a nozzle effect whereby the back pressure is decreased on the outflow area of the rotating wheel. The flow of the water through the turbine is made easier, the turbine is more effective than when the ejectors are closed under high water conditions, and the efficiency is increased to a maximum.

Having now fully described my invention what I claim and desire to secure by Letters Patent is:—

1. In a turbine, a discharge pipe having a receiving end connected to an impulse or reaction wheel, and a discharge end at an angle to the receiving end and communicating with the tail race, said ends being connected by a pipe bend, and an auxiliary water inlet conduit or nozzle in said bend functioning as an ejector and arranged to discharge axially of said discharge end.

2. In a turbine, a discharge pipe having a receiving end connected to an impulse or reaction wheel, and a discharge end at an angle to the receiving end and communicating with the tail race, said ends being connected by a pipe bend, an auxiliary water inlet conduit or nozzle in said bend functioning as an ejector and arranged to discharge axially of said discharge end, and valve means for controlling said auxiliary water inlet.

3. In a turbine, a pipe arranged to receive water discharged from the impulse or reaction wheel, said pipe having a plurality of sets of openings communicating with the exterior of said pipe, each opening functioning as an ejector, and separate valve means for controlling the respective sets of openings.

4. In a turbine construction, a pair of inflow turbines, a double bend outflow pipe arranged to receive the water discharged from said turbines, a plurality of sets of openings communicating with the exterior of said pipe, one of said sets of openings being in relative close proximity to the discharge area of one turbine, and the other set being in relatively close proximity to the discharge area of the other turbine, valves for respectively controlling each set of openings, and separate means for actuating said valves.

Signed at Helsingfors, Finland, this 28th day of April, A. D. 1920.

KARL AXEL AHLFORS.